July 3, 1962 — O. J. B. ORWIN — 3,042,187
ROLLER SUPPORTS FOR CONVEYOR BELTS
Filed Sept. 18, 1959 — 2 Sheets-Sheet 1
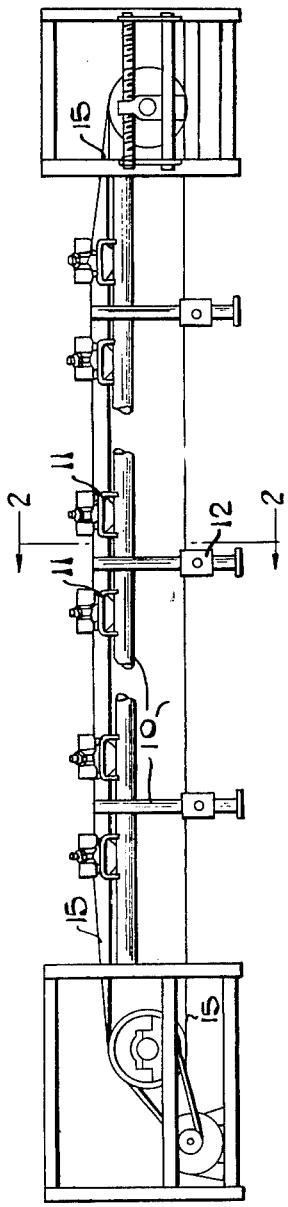
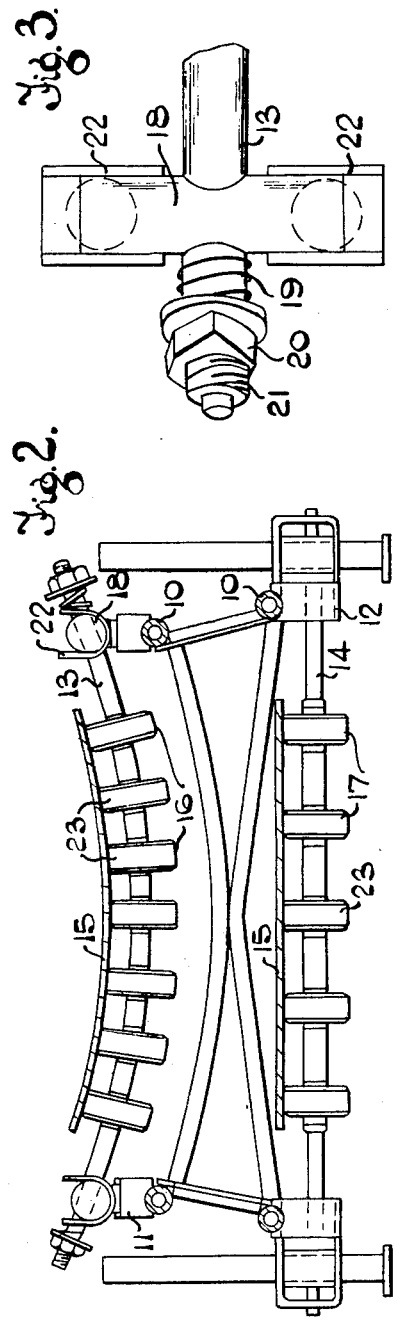
INVENTOR
Olaf John Barclay Orwin
BY
Ayates Dowell
ATTORNEY

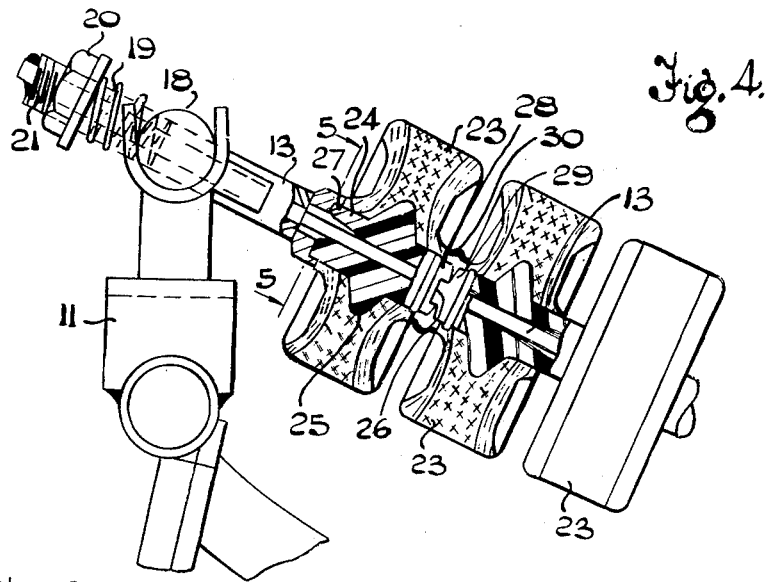
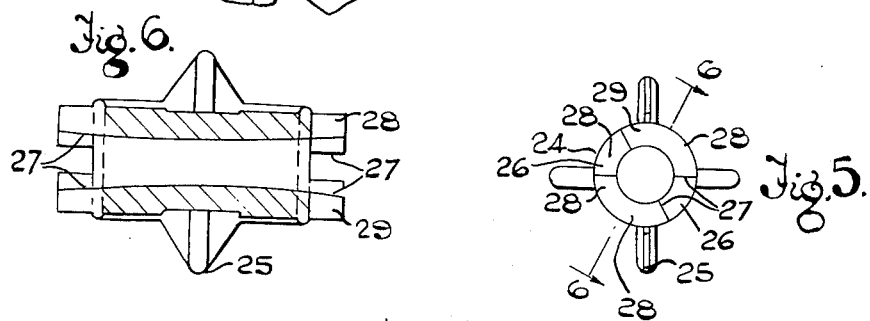
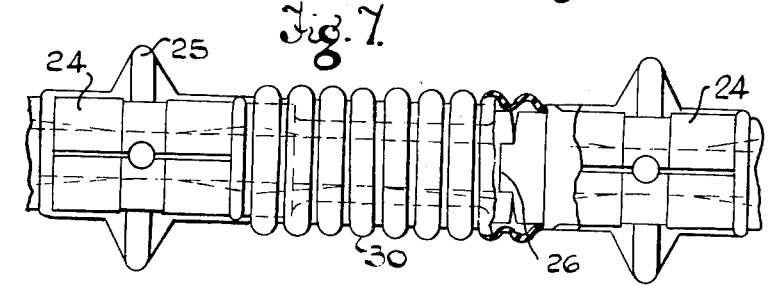
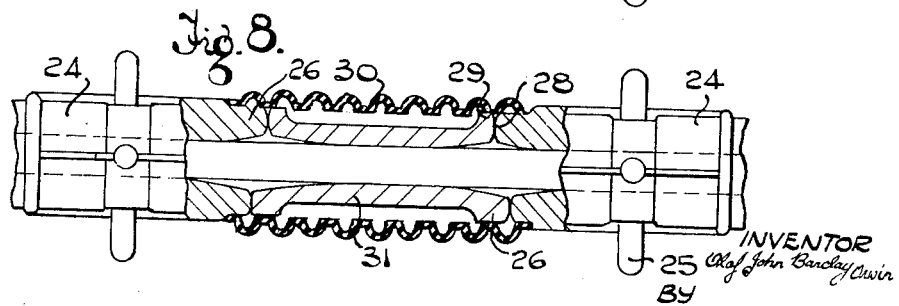

United States Patent Office 3,042,187
Patented July 3, 1962

3,042,187
ROLLER SUPPORTS FOR CONVEYOR BELTS
Olaf John Barclay Orwin, Quinton, Birmingham, England, assignor to Fisher & Ludlow Limited, Birmingham, England, a company of Great Britain
Filed Sept. 18, 1959, Ser. No. 840,874
Claims priority, application Great Britain Sept. 20, 1958
7 Claims. (Cl. 198—192)

This invention relates to roller supports for conveyor belts of the kind comprising a shaft on which is mounted for free rotation, a plurality of roller elements which serve to support the conveyor belt, the arrangement being such that during operation the roller elements themselves rotate in relation to the shaft as opposed to the roller elements and the shaft rotating together as a single unit, the shaft being of bowed form so that the belt is supported in trough-like configuration.

Such shaft may, for example, comprise a resilient prebowed bar or tube capable of bending to different curvatures in accordance with the nature of the belt loading.

Alternatively, the shaft may be constructed as a flexible cable or helical spring.

Hitherto, in roller supports of the above kind the roller elements have customarily been mounted for rotation independently of one another.

In roller supports of the above kind it is necessary to locate the roller element against movement in a direction along the axis of the shaft and a convenient way of doing this is to provide the hub portions of the roller elements with axially projecting shoulders, or alternatively, to provide the roller elements with bearing sleeves, the ends of which extend axially beyond the adjacent end face of the roller element, the arrangement being such that the shoulders, or bearing sleeve ends of adjacent rollers are adapted to engage with one another for the purpose of maintaining the roller elements in the desired axial location.

With such an arrangement, by reason of the relative rotational movement which can and in fact does occur between adjacent so engaging roller elements, a considerable amount of friction and heat is developed during the operation of the conveyor at the relatively moving engaging surfaces, the effect of which is obviously undesirable, such an undesirable effect being increased by the fact that commonly, conveyor belts are used under conditions where there is a good deal of dust or other abrasive material which is liable to find its way between the inter-engaging surfaces aforementioned.

The present invention has for its object the provision of an improved form of roller support in which the disadvantage of the existing arrangement above referred to is avoided.

According to the present invention each roller element is provided on one end thereof with abutments having axially extending abutment faces which engage with axially extending abutment faces provided on further abutments connected non-relatively rotatably to the axially adjacent roller element, said inter-engaging abutments being so formed as to permit of relative angular movement occurring between the planes of rotation of mutually adjacent roller elements consequent on the curved configuration of the bowed shaft.

The non-relatively rotatable connection referred to may be provided by providing the said abutments in every case on the roller elements themselves so that these are connected directly together in a non-relatively rotatable manner.

Alternatively, the non-relatively rotatable connection may be provided by a connecting sleeve constructed separately from the roller elements, each sleeve being formed on each of its two ends with axially extending abutment faces which engage in a non-relatively rotatable manner with corresponding abutment faces provided on the axially opposed ends of axially adjacent roller elements.

For example, the said abutments may be constructed as axially directed dogs, the side faces of which constitute the said abutment faces.

Preferably the said abutments are so formed as to be adapted to have rolling engagement with one another on their axially directed and opposed end faces, so as to maintain the roller elements against relative axial movement while permitting of their aforesaid relative angular movement with the minimum of friction between the relatively angularly moving roller elements.

Insofar as the flexible shaft is of bowed configuration, it will be appreciated that the axes of rotation of adjacent rollers are not aligned and consequently relative movement in planes containing the shaft must occur between adjacent rollers during their rotation, and it is therefore advantageous that the relative movement between the said engaging axially directed end faces of the dogs or other abutments should be a rolling movement rather than a sliding movement for the purpose of still further reducing the friction and consequent heat generated at these positions.

The invention is illustrated in the accompanying drawings wherein:

FIGURE 1 is a side elevation of one form of endless belt conveyor embodying the present invention.

FIGURE 2 is a cross sectional view to an enlarged scale on the line 2—2 of FIGURE 1.

FIGURE 3 is a detailed plan view of part of the same construction.

FIGURE 4 is an enlarged part-sectional view of part of the construction depicted in FIGURE 2.

FIGURE 5 is an end view of one of the roller hubs taken on the line 5—5 of FIGURE 4.

FIGURE 6 is a section on the line 6—6 of FIGURE 5.

FIGURES 7 and 8 are respectively side elevations and part-sectional side elevations to an enlarged scale of part of a modification of the construction depicted in FIGURES 1 to 6.

Referring firstly to the construction illustrated in FIGURES 1 to 6 of the drawings, FIGURE 1 depicts an endless belt conveyor of generally conventional form comprising a longitudinally extending framework 10, on opposite longitudinally extending sides of which are mounted brackets 11, 12, for supporting opposite ends of transverse shafts 13, 14, spaced at intervals along the length of the framework, which shafts, as hereinafter described, form part of the roller supports for the endless conveyor belt 15.

The upper or load carrying run of this belt is required to be of trough configuration, and the shafts 13 of the associated roller supports 16 are accordingly preformed to bowed configuration, as shown in FIGURE 2, being in fact constructed as a resilient prebowed metal bar or tube.

The shafts 14 which form part of the roller supports 17 for the return or idle run of the belt are straight since this part of the belt is not required to be of trough configuration.

As shown most clearly in FIGURE 3, the opposite ends of each roller shaft 13 extend diametrically through a trunnion 18 so as to be capable of sliding relative to the trunnion in a direction along the length of the adjacent end of shaft 13.

Such sliding movement is controlled by a compression spring 19 acting between the trunnion 18 and a nut 20, threadably and consequently adjustably mounted on the two extremities 21 of each of the shafts 13.

Thus, in the known manner the two extremities 21 of each shaft 13 are free to move relative to the trunnion 18 towards the longitudinal centre line of the upper run of the belt under the control of the loading of spring 19.

Each trunnion 18 is of cylindrical form in cross section and has its two ends supported by a pair of yokes 22 of U configuration and carried by the associated framework bracket 11, the arrangement being such that each trunnion 18 is free to pivot within the associated yoke about an axis parallel to the length of the trunnion.

The arrangement is accordingly such that each shaft 13 is capable of assuming different curvatures according to the nature of the belt loading, the two ends of each shaft in so doing pivoting with their respective trunnions 18 within the U shaped yokes 22 and the two shaft ends moving towards or away from one another by reason of the fact that the shafts 13 are free to slide in the direction of their length within each trunnion 18 under the control of the associated compression spring 19.

The trunnions 18 are supported by the yokes 22 against turning about the axes of the adjacent end of shaft 13 and the springs 19 serve to restrain the shafts 13 against turning relative to the trunnions 18.

Accordingly each shaft 13 is bowed only in a vertical plane perpendicular to the length of the adjacent part of the belt, being free to assume different curvatures in such plane by reason of the fact that the two shaft ends are free to move relatively angularly as well as to move towards or away from one another in the manner permitted by their aforesaid mounting.

Each of the two shafts 13, 14, have rotatably mounted thereon a number of roller elements 23, which, as best shown in FIGURE 4, are of disc-like form and are made in a non-metallic material, e.g. a moulded rubber or a polyvinyl chloride resin, each disc being provided with a central separate bearing hub 24, which is freely rotatable on the exterior of the supporting shaft, namely shaft 13 in FIGURE 4.

Such bearing hub 24 is conveniently formed in nylon and is formed medially of its length with a number of peripheral radially extending projections 25, around which the material constituting the roller element 23 is moulded so that the hub is securely anchored within the main body of the roller element, thus ensuring that the several parts of each roller element rotate together.

Each roller hub 24 has its bore of outwardly tapered configuration adjacent each end of the bore so that only the medial portion of the hub is in contact with the shaft 13, the arrangement permitting of the shaft 13 flexing or bowing as above described to different curvatures in accordance with the belt loading without such movement being in any way restrained by the comparative rigidity of the nylon forming the roller hub.

As shown in FIGURE 4, each roller hub extends axially beyond the end of the adjacent roller element, and each end of each hub is formed, as shown more particularly in FIGURE 5, with three symmetrically circumferentially spaced abutments 26 in the form of axially extending dogs, the dogs on each of their two sides presenting axially extending abutment faces 27, most clearly depicted in FIGURE 6.

As best shown in FIGURE 5, the dogs are all of the same dimension measured in a circumferential direction so that the axially extending abutment faces 27 of the dogs 26 at one end of each roller element 23 engage directly with corresponding axially extending abutment faces 27 provided on the opposed end of the axially adjacent roller element.

The arrangement is accordingly such that a direct non-relatively rotatable connection is thereby provided between axially adjacent roller elements so that all of the roller elements on a given shaft 13 are constrained to rotate together and relative rotational movement between axially adjacent roller elements is positively precluded.

The distance measured along any given circle between the two abutment faces 27 of each dog 26 is slightly less than the distance measured along the same circle between the circumferentially opposed faces 27 of circumferentially adjacent dogs.

Thus slight clearance is provided between the interengaging abutment faces 27 of the dogs associated with the two adjacent roller elements which assists in permitting the aforementioned free flexure of shaft 13.

Further, the axially directed or end abutment faces 28 of each dog and the axially directed or end abutment faces 29 of the roller hubs with which the dogs are adapted to engage are each of slightly convex configuration so as to be curved in a plane which is radial in respect of the axis of the shaft 13. Such inter-engagement serves in the known manner to locate the roller elements relatively in a direction axially of shaft 13.

Thus, when the roller elements 23 rotate about the curved shaft 13 and in consequence of its curvature are thereby caused to move relatively angularly about axes perpendicular to the length of the adjacent shaft 13, the resultant relative movement between the said interengaging axially directed faces 28, 29, is a purely rolling engagement and such engagement consequently provides the minimum of constraint against flexure of the shaft 13 and at the same time wear of these inter-engaging faces 28, 29, is precluded as far as possible.

The inter-engaging dogs 26 are enclosed within a flexible dust excluding sleeve 30 which, as shown, is medially of outwardly bowed configuration so that the sleeve is of maximum flexibility so as to facilitate the free flexure of shaft 13.

Instead of providing a direct non-relatively rotatable connection between the hubs of axially adjacent roller elements 23, the axially directed dogs 26 of axially adjacent roller elements may be non-relatively rotatably connected through the medium of an intermediate connecting sleeve 31, as shown in FIGURES 7 and 8, opposite ends of each sleeve being formed in manner similar to each roller hub 24 so as to have an axially outwardly tapered bore and be provided with dogs having axially directed abutment faces 27 in like manner to the preceding construction.

Thus each roller element 23 on one of its two ends is provided on its associated hub with axially directed dogs providing the said axially extending abutment faces 27 and these engage in the manner above described with corresponding axially extending abutment faces on the adjacent end of connecting sleeve 31 so as through the said sleeve to be connected non-relatively rotatably at the other end of the sleeve through a further similar set of axially extending abutment faces to the axially adjacent roller element 23.

The sleeves have axially directed end abutmentt faces 28, 29, of convex configuration in like manner to the preceding described construction for the purpose already described.

Thus either arrangement provides a non-relatively rotatable connection between all of the roller elements 23 on each of the roller supporting shafts 13 which support the load carrying run of the conveyor belt, and all of the several roller elements on each of these shafts are accordingly constrained to rotate together, thereby avoiding the disadvantage already referred to of the previously known construction.

A dust excluding flexible sleeve of bellows-like configuration may be provided as indicated at 30, for enclosing the inter-engaging dogs 26 at each end of each connecting sleeve 31 with this last described construction.

The roller elements which support the idle or return run of the belt and which are mounted on the straight shafts 14, may be connected together in a non-relatively rotatable manner by an arrangement similar to that above described but this feature forms no part of the present invention.

What I claim then is:

1. A roller support for a conveyor belt comprising, a flexible shaft of bowed configuration, means mounting opposite ends of said shaft for relative angular movement in the plane of bowing, a plurality of roller elements mounted for free rotation on said shaft, said roller elements being disposed in axially spaced side-by-side relationship, opposite axially extending dogs of rigid form on the opposed ends of adjacent roller elements, said axially extending dogs on adjacent roller elements having inter-engaging mutually opposed axially extending recesses and projections, and those parts of the projections and recesses which in a radial direction are furthest from the central axis of the shaft having their axially opposed end faces spaced apart in a direction axially of the shaft.

2. A roller support for a conveyor belt comprising, a flexible shaft of bowed configuration, means mounting opposite ends of said shaft for relative angular movement in the plane of bowing, a plurality of roller elements mounted for free rotation on said shaft, said roller elements being disposed in axially spaced side-by-side relationship, opposite axially extending dogs of rigid form on the opposed ends of adjacent roller elements, said axially extending dogs on adjacent roller elements having inter-engaging mutually opposed axially extending recesses and projections, the axially opposed end faces of mutually opposed projections and recesses being of convex configuration with the axis of curvature extending in a direction which is tangential to the periphery of the flexible supporting shaft.

3. A roller support for a conveyor belt comprising, a flexible shaft adapted under different belt loadings to assume different bowed configurations, means mounting opposite ends of said shaft for relative angular movement in the plane of bowing, a plurality of roller elements mounted for free rotation on said shaft, said roller elements being disposed in axially spaced side-by-side relationship, each of said roller elements comprising a rigid hub portion and a body portion of disc-like configuration secured to said hub portion, said rigid hub portions being formed integrally with oppositely axially extending rigid dogs disposed at the opposed ends of adjacent roller elements, said oppositely axially extending dogs being connected together in non-relatively rotational relationship, and said connected together axially extending dogs having oppositely directed end faces spaced relatively apart so as to permit relative angular movement between axially adjacent roller elements consequent on the bowing of the shaft to different curvatures.

4. A roller support for a conveyor belt comprising, a flexible shaft of bowed configuration, means mounting opposite ends of said shaft for relative angular movement in the plane of bowing, a plurality of roller elements mounted for free rotation on said shaft, said roller elements being disposed in axially spaced side-by-side relationship, each of said roller elements comprising a rigid hub portion and a body portion of disc-like configuration secured to said hub portion, said axially extending dogs on adjacent roller elements having inter-engaging mutually opposed axially extending recesses and projections, and those parts of the projections and recesses which in a radial direction are furthest from the central axis of the shaft having their axially opposed end faces spaced apart in a direction axially of the shaft.

5. A roller support for a conveyor belt comprising, a flexible shaft of bowed configuration, means mounting opposite ends of said shaft for relative angular movement in the plane of bowing, a plurality of roller elements mounted for free rotation on said shaft, said roller elements being disposed in axially spaced side-by-side relationship, each of said roller elements comprising a rigid hub portion and a body portion of disc-like configuration secured to said hub portion, said axially extending dogs on adjacent roller elements having inter-engaging mutually opposed axially extending recesses and projections, and the axially opposed end faces of mutually opposed projections and recesses being of convex configuration with the axis of curvature extending in a direction which is tangential in relation to the periphery of the flexible supporting shaft.

6. A roller support for a conveyor belt comprising a flexible shaft adapted under different belt loadings to assume different bowed configurations, means mounting opposite ends of said shaft for relative angular movement in the plane of bowing, a plurality of roller elements mounted for free rotation on said shaft, said roller elements being disposed in axially spaced side-by-side relationship, opposite axially extending dogs of rigid form on the opposed ends of adjacent roller elements, said opposite axially extending dogs being connected together in non-relative rotational relationship, by sleeves mounted rotatably on said flexible shaft, the sleeves at each end thereof being formed with axially extending dogs with which said roller element dogs engage, with said axially extending dogs on adjacent roller elements and sleeves having interengaging axially extending mutually opposed recesses and projections, and those parts of the projections and recesses which in a radial direction are furthest from the central axis of the shaft having their axially opposed end faces spaced apart in a direction axially of the shaft.

7. A roller support for a conveyor belt comprising a flexible shaft of bowed configuration, means mounting opposite ends of said shaft for relative angular movement in the plane of bowing, a plurality of roller elements mounted for free rotation on said shaft, said roller elements being disposed in axially spaced side-by-side relationship, opposite axially extending dogs of rigid form on the opposed ends of adjacent roller elements, said opposite axially extending dogs being connected together in non-relative rotational relationship, by sleeves mounted rotatably on said flexible shaft, the sleeves at each end thereof being formed with axially extending dogs with which said roller dogs engage, with said axially extending dogs on adjacent roller elements and sleeves having interengaging axially extending mutually opposed recesses and projections, and the axially opposed end faces of mutually opposed projections and recesses being of convex configuration with the axis of curvature extending in a direction which is tangential in relation to the periphery of the flexible supporting shaft.

References Cited in the file of this patent
UNITED STATES PATENTS

| | | |
|---|---|---|
| 993,701 | Messiter | May 30, 1911 |
| 2,582,280 | Robertson | Jan. 15, 1952 |
| 2,596,499 | Mercier | May 13, 1952 |
| 2,942,721 | Kidd et al. | June 28, 1960 |